United States Patent
Muramatsu

(10) Patent No.: US 6,898,639 B2
(45) Date of Patent: May 24, 2005

(54) DISTRIBUTED-PROCESSING SYSTEM AND COMMAND TRANSFER METHOD IN THE SAME

(75) Inventor: Koji Muramatsu, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 788 days.

(21) Appl. No.: 09/797,825

(22) Filed: Mar. 5, 2001

(65) Prior Publication Data

US 2002/0091830 A1 Jul. 11, 2002

(30) Foreign Application Priority Data

Jan. 10, 2001 (JP) ..................................... P2001-002411

(51) Int. Cl.[7] .............................................. G06F 15/16
(52) U.S. Cl. ....................... 709/232; 709/203; 709/205; 709/228
(58) Field of Search ................................. 709/201, 203, 709/217, 219, 227, 228, 232, 235, 204

(56) References Cited

U.S. PATENT DOCUMENTS

| | | | | |
|---|---|---|---|---|
| 5,550,962 A | * | 8/1996 | Nakamura et al. | 709/232 |
| 5,822,525 A | * | 10/1998 | Tafoya et al. | 709/204 |
| 6,337,689 B1 | * | 1/2002 | Hochmuth et al. | 345/522 |
| 6,442,696 B1 | * | 8/2002 | Wray et al. | 713/201 |
| 6,535,878 B1 | * | 3/2003 | Guedalia et al. | 707/8 |
| 6,618,759 B1 | * | 9/2003 | Lefebvre et al. | 709/235 |

OTHER PUBLICATIONS

U.S. Appl. No. 09/817,259, filed Mar. 27, 2001 to Muramatsu.
U.S. Appl. No. 09/543,081, filed Apr. 4, 2000 to Muramatsu et al.

* cited by examiner

Primary Examiner—Bunjob Jaroenchonwanit
Assistant Examiner—Phuoc H. Nguyen

(57) ABSTRACT

A distributed-processing system, composed of a first computer and a second computer, in which the first computer transfers, to the second computer, a pattern ID assigned to a series of commands instead of the series of commands in order to reduce the communications traffic in case of transferring the same series of commands.

16 Claims, 3 Drawing Sheets

DISTRIBUTED-PROCESSING SYSTEM AND COMMAND TRANSFER METHOD IN THE SAME

FIELD OF THE INVENTION

The present invention relates to a distributed-proceeding system in which a first computer transfers a series of commands to a second computer connected via a network in order to entrust part of a process to the second computer. The present invention, more particularly, relates to a distributed-processing system in which a first computer assigns the pattern identifier (ID) to the same series of commands and transfers, to a second computer, the pattern ID instead of these commands in a subsequent transfer process in order to reduce communications traffic between these two computers.

BACKGROUND AND MATERIAL INFORMATION

A distributed-processing environment using Internet has become popular in recent years because of the diffusion of Java, an object-oriented programming language for Internet. In a distributed-processing system, a process is distributed among a plurality of computers connected with each other via a network and is cooperatively performed by them.

In the simplest distributed-processing system in which a server computer entrusts part of a process to a client computer, the server computer transfers a series of commands to perform the partial process (hereinafter also referred to as "command group") to the client computer.

The server computer may need to transfer a lot of command groups at the same time after batch processing for them or to transfer each of these command groups severally in order of the time of issue. For example, in a conventional automatic distributed-processing system, when a server computer entrusts a client computer with drawing a blue cross composed of two blue line segments mutually crossing at right angles, the server computer generates a series of drawing commands #1, #2, and #3. These drawing commands #1 through #3 may be "SET A COLOR (BLUE)", "DRAW A LINE (10,10)-(20,20)", and "DRAW A LINE (20,10)-(10,20)", respectively. The server computer transfers these drawing commands to the client computer sequentially according to a prescribed rule on description of drawing commands. The client computer receives these commands and draws the blue cross on the screen according to them.

There may be a case where a window being displayed on the screen is resized according to an instruction by a user after drawing the blue cross. In such a case, when receiving a communication that the event has occurred in the client computer, the server computer conventionally retransfers the very same drawing commands #1 through #3 to the client computer.

There may be some other cases where the server computer retransfers the same drawing commands to the client computer as follows:

(1) A window displayed on the screen is turned into an icon for a while. Subsequently, the icon is restored to the window displayed on the screen; and (2) A window is moved from far side of another window to this side of it on the screen.

It is very inefficient from the viewpoint of data communication to retransfer the same drawing command group as that previously transferred. Therefore, an improvement of the conventional command transfer method has been desired.

Moreover, many similar series of drawing command may be issued to draw similar graphical user interface (GUI) parts, for example, two buttons of a different color. Therefore, it is also desired to improve the conventional command transfer method from the viewpoint of transferring a similar drawing command group to that previously transferred.

However, a conventional command relay library, which manages a command transfer process between both computers, is generally produced for a wide use so that the library may operate in cooperation with every application program, which directs the library to transfer a command group. So it is wasteful and impractical to preinstall every pattern of command group in the library at the stage of production.

It is difficult to commonly manage every pattern of command group because each pattern varies according to an application program. Additionally, because the processing method of the application program is usually not opened co the public, it is difficult to know every pattern of command group unless the server computer actually executes the application program.

As described above, even though two or more command groups have the same or similar patterns in common, every command group is conventionally transferred from the server computer to the client computer periodically or each time the command group is issued. Therefore, an improvement of a command transfer method is desired in order to reduce the whole amount of communication traffic.

SUMMARY OF THE INVENTION

Accordingly, the present invention is directed to a distributed-processing system and a command transfer method in the distributed-processing system that substantially obviates one or more of problems due to limitations and disadvantages of the prior art.

In accordance with the purpose of the present invention, as embodied and broadly described, the present invention is directed to a distributed-processing system in which a first computer entrusts part of a process to a second computer. The first computer includes means for generating a series of commands to perform the partial process, means for assigning a pattern ID to the series of commands, means for transferring the series of commands with the corresponding pattern ID to the second computer, and means for managing the relation between the, series of commands and the corresponding pattern ID. The assigning means does not assign a new pattern ID to a series or commands in a case where the same series of commands has been managed by the managing means and the transferring means transfers the pattern ID alone to the second computer instead of the series of commands in this case. The second computer includes means for receiving the series of commands with the corresponding pattern ID or the pattern ID alone from the transferring means, means for executing the received series of commands, means for managing the relation between the series of commands and the corresponding pattern ID received from the transferring means, and means for reading the series of commands assigned with the received pattern ID by referring to the second computer's managing means in a case the pattern ID alone is received. The executing means executes the read series of commands in this case.

Also in accordance with the present invention, there is provided a computer which entrusts part of a process to another computer. The computer comprises means for generating a series of commands to perform the partial process, means for assigning a pattern identifier to the series of commands, means for transferring the series of commands with the corresponding pattern ID to the other computer, and means for managing the relation between the series of commands and the corresponding pattern ID. The assigning means does not assign a new pattern ID to a series of commands in a case where the same series of commands has been managed by the managing means and the transferring means transfers the pattern ID alone to the other computer instead of the series of commands in this case.

Further in accordance with the present invention, there is provided a computer which is entrusted part of a process from another computer. The comprises means for receiving a series of commands with a corresponding pattern ID or a pattern ID alone from the other computer, means for executing the received series of commands, means for managing the relation between the series of commands and the corresponding pattern ID received from the transferring means, and means for reading the series of commands assigned with the received pattern ID by referring to the managing means in a case the pattern ID alone is received. The executing means executes the read series of commands in this case.

BRIEF DESCRIPTION OF THE DRAWINGS

A more complete appreciation of the present invention and many of the attendant advantages thereof will be readily obtained as the same becomes better understood by reference to the following detailed description, when considered in connection with the accompanying drawings, wherein.

DETAILED DESCRIPTION

Figure 1:
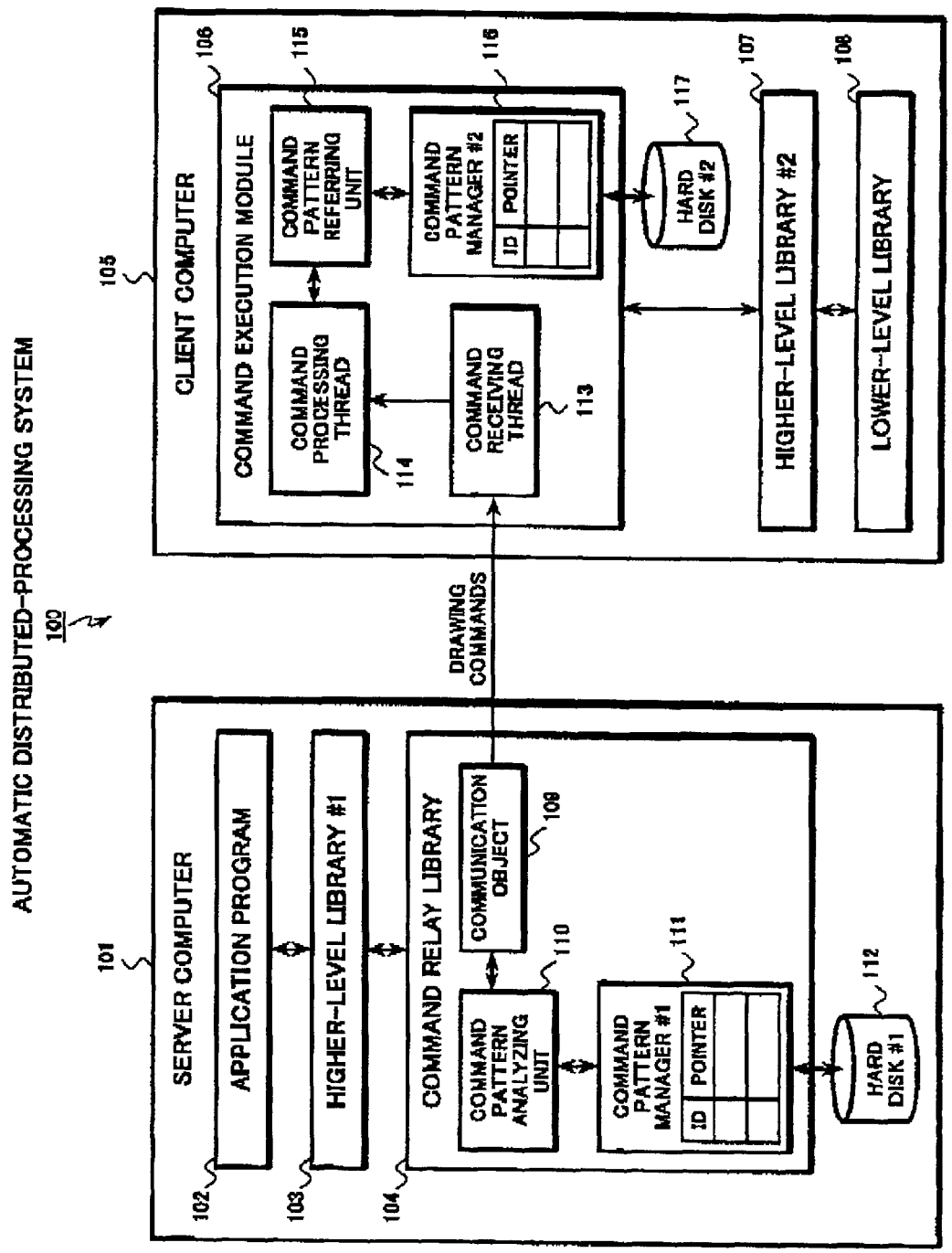
FIG. 1 is a schematic block diagram depicting an example of an automatic distributed-processing system consistent with the present invention.

FIG. 1 is a schematic block diagram depicting an example of an automatic distributed-processing system 100 composed of a server computer 101 and a client computer 105. When transferring a series of drawing commands to the client computer 105, the server computer 101 dynamically analyzes the pattern of the commend group and assigns a pattern ID to them as the occasion demands.

The server computer 101, which entrusts part of a drawing process to the client computer 105, is mainly composed of an application program 102, the higher-level library #1 103, and a command relay library 104. The application program 102 specifying GUI processing is programmed using libraries equivalent to both the higher-level library #1 103 and a lower-level library #2 108 (described later) The application program 102 carries out the GUI processing and directs the higher-level library #1 103 to draw GUI parts such as a button. At the direction of the application program 102, the higher-level library #1 103, having common logics to various platforms, generates a series of commands to draw the button and transfers the command group to the command relay library 104 having both APT compatibility with the lower-level library 108 and the dependency on each platform. When receiving the command group, the command relay library 104 transfers the command group to the client computer 105.

The client computer 105 is mainly composed of a command execution module 106, a higher-level library #2 107, and a lower-level library 108. The execution module 106, being stationed in the client computer 105 as a demon for processing the command group transferred from the command relay library 104, performs the drawing process using both the higher-level library #2 107, the same library as the higher-level library #1 103, and the lower-level library 108.

The drawing process may be originally performed by a single computer having the application program 102, the higher-level library #1 103, and the lower-level library 108. In the automatic distributed-processing system 100, these units are distributed between the server computer 101 and the client computer 105 in order to distribute the process. Moreover, the command relay library 104 and the command execution module 106 are added to the server computer 101 and the client computer 105, respectively.

When the application program 102 in operation first accesses the higher-level library #1 103 to use the command relay library 104, for example, when the application program 102 issues a direction to generate a button object to the higher-level library #1 103, the command relay library 104 receives the direction via the higher-level library #1 103 and generates a command communication object 109, a command pattern analyzing unit 110, and a command pattern manager #1 111.

In the above-described process, the higher-level library #1 103 transforms the drawing direction into a series of drawing commands, such as a command group for generating the frame of the button and a character string thereon, etc. The higher-level library #1 103 transfers the command group to the command relay library 104.

The command pattern analyzing unit 110 analyzes the pattern of each command group before transferring them to the client computer 115. When recognizing that the pattern of newly generated command group has not yet been recorded in the command pattern manager #1 111, the command pattern analyzing unit 110 assigns a new pattern ID to the command group and records the pattern ID with the command group in the command pattern manager #1 111.

In such a case, the actual command group may be stored in a memory of the server computer 101 and the pattern ID is recorded in the command pattern manager #1 111 together with a pointer indicating the command group's position in the memory. After the pattern ID is recorded in the command pattern manager #1 111, the actual command group is transferred to the client computer 105 together with the pattern ID via the communication object 109.

On the other hand, when referring to the command pattern manager #1 111 for the pattern of newly generated command group and recognizing that the same pattern has been already recorded in it, the command pattern analyzing unit 110 transfers the pattern ID assigned to the same pattern instead of the actual command group to the client computer 105 via the communication object 109. When recognizing that a similar pattern has been recorded, the command pattern analyzing unit 110 transfers the pattern ID assigned to the similar pattern and difference information between both command groups.

The command pattern analyzing unit 110 and the command pattern manager #1 111 disappear when the application program 102 ends. So management information on pattern IDs recorded in the command pattern manager #1 111 and corresponding actual command groups stored in the memory may be stored in a hard disk #1 112 at this timing. The command pattern analyzing unit 110 and the command pattern manager #1 111 are generated when the application program 102 restarts and issues a direction. So the command pattern analyzing unit 110 may read the management information stored in the hard disk #1 112 at this time.

On the other hand, the client computer 105 receives an actual command group and a pattern ID transferred from the communication object 109 by a command receiving thread 113 generated in the command execution module 106. The command execution module 106 generates the command receiving thread 113, a command processing thread 114, a command pattern referring unit 115, and a command pattern manager #2 116 when the command execution module 106 starts being stationed in the client computer 105.

When receiving the command group and the pattern ID, the command receiving thread 113 transfers them to the command processing thread 114. When receiving them from the command receiving thread 113, the command processing thread 114 directs the command pattern referring unit 115 to refer to the command group in the manager #2 116 for the pattern ID. When the pattern ID has not been recorded in the manager #2 116, the command pattern referring unit 115 records the pattern ID with the command group in the manager #2 116. In such a case, the actual commands may be stored in a memory of the client computer 105 and the pattern ID is recorded in the command pattern manager #2 116 together with a pointer indicating the command group's position in the memory.

When completing the recording, the command pattern referring unit 115 informs the command processing thread 114 of the completion. Then the command processing thread 114 executes the command group and the GUI part is displayed on the screen of the client computer 105.

When receiving the pattern ID alone, the command receiving thread 113 transfers it to the command processing thread 114. When receiving it from the command receiving thread 113, the command processing thread 114 directs the command pattern referring unit 115 to refer to the command group in the manager #2 116 for the pattern ID. When the pattern ID has been recorded, the command pattern referring unit 115 reads the corresponding command group based on the management information on the pattern IDs stored in the manager #2 116 and supplies the command group to the command processing thread 114. Then the command processing thread 114 executes the command group to draw the GUI part on the screen.

Moreover, when receiving the pattern ID and the difference information, the command receiving thread 113 transfers them to the command processing thread 114. When receiving them from the pattern command and receiving thread 113, the command processing thread 114 directs the command pattern referring unit 115 to refer to the command group in the manager #2 116 for the pattern ID. When the pattern ID has been recorded, the command pattern referring unit 115 reads the corresponding command group, regenerates, based on the command group and the difference information, an original command group, and supplies the original command group to the command processing thread 114. Then the command processing thread 114 executes the original command group.

The command ref erring unit 115 and the command pattern manager #2 116 disappear when the command execution module 106 ends. So management information on pattern IDs recorded in the command pattern manager #2 116 and corresponding actual command groups stored in the memory may be stored in a hard disk #2 117 at this timing. The command pattern referring unit 115 and the command pattern manager #2 117 are generated when the execution module 105 restarts and issues a direction. So the command pattern referring unit 115 may read the management information stored in the hard disk #2 117 at this time.

In the above explanation, a method for transferring drawing commands in the direction from the server computer 101 to the client computer 105 is described. Actually, the command execution module 106 transfers an event such as a click by a user and a return value from the client computer 105 to a command receiving thread (not shown in FIG. 1) generated in the server computer 101. However, an explanation of such communication is omitted in order to simplify the explanation of this embodiment.

Figure 2:
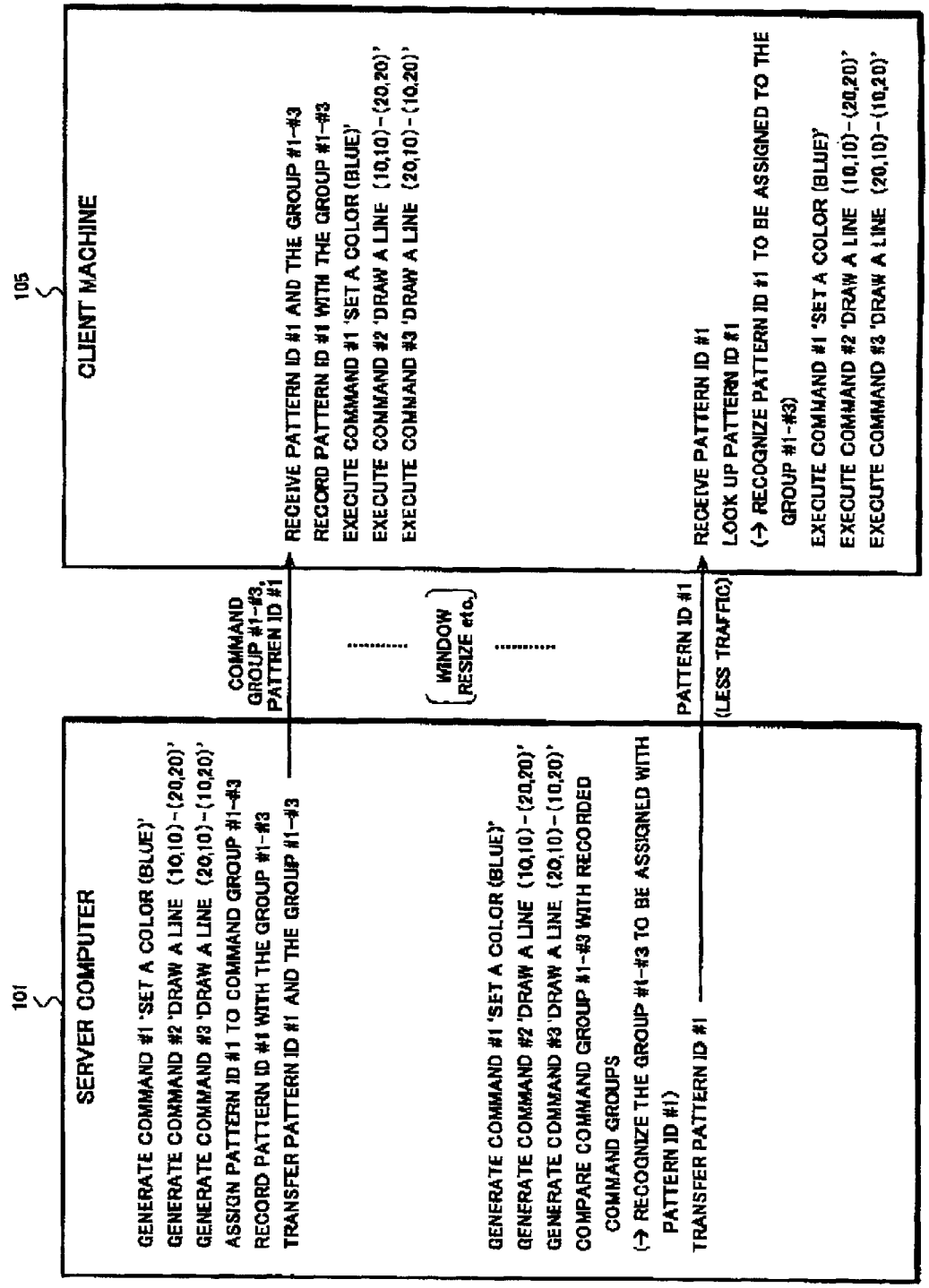
FIG. 2 is a diagram depicting an exemplary procedure for transferring command group having the same pattern as that previously transferred.
Figure 3:
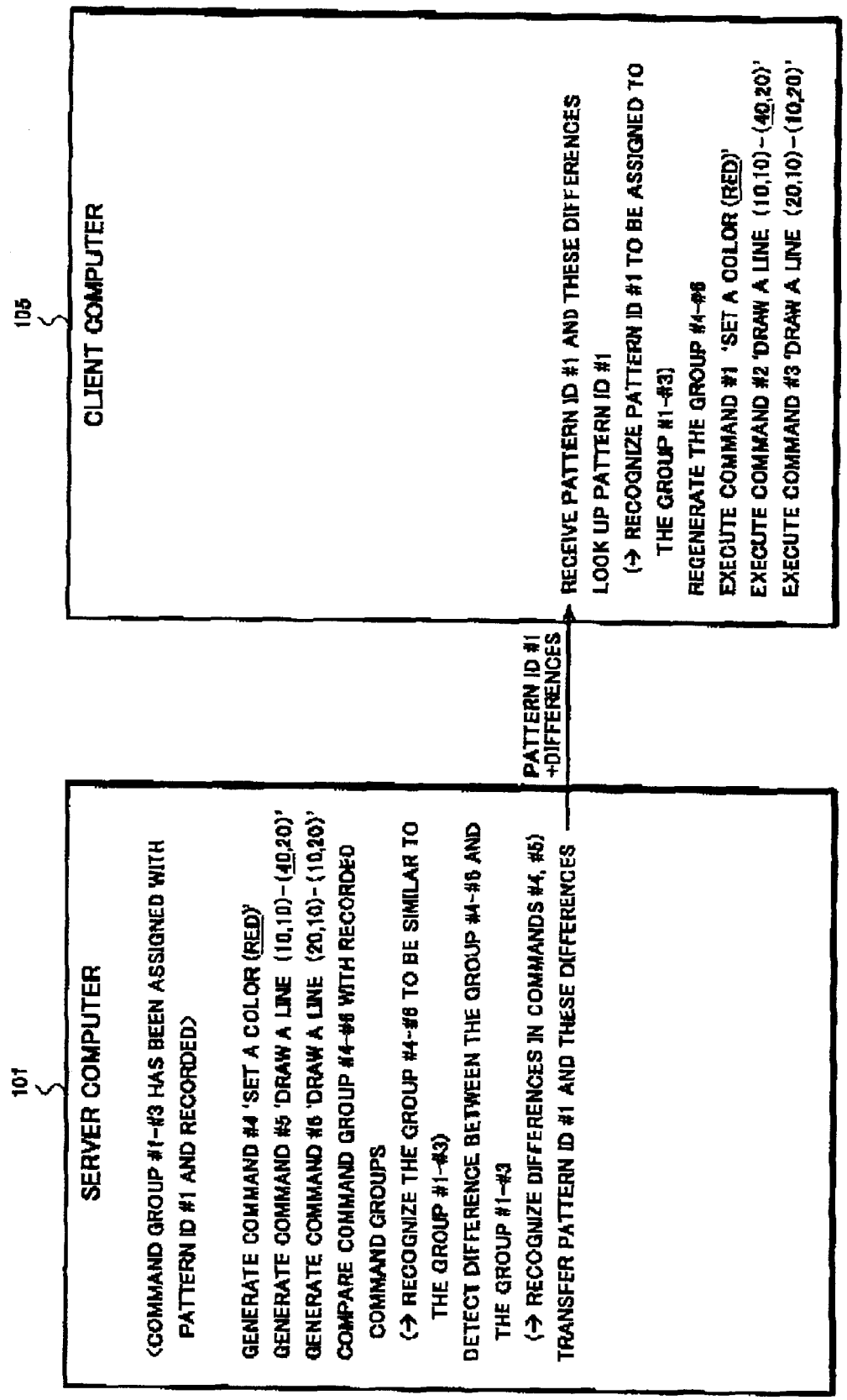
FIG. 3 is a diagram depicting an exemplary procedure for transferring command group having a similar pattern to that previously transferred.

Next, procedures for transferring command groups in the automatic distributed-processing system 100 will be explained by referring to FIGS. 2 and 3. FIG. 2 is a diagram depicting an exemplary procedure for transferring command group having the same pattern as that previously transferred.

The command pattern analyzing unit 110 sections a series of commands based on a minimum number of commands predetermined to be enough to recognize the pattern of the command group and determines whether a pattern ID of the command group has been stored in the command pattern manager #1 111. In FIG. 2, although the minimum number of commands is set at three, the set number may be changed, as the need arises.

The higher-level library #1 103 generates a series of commands #1, #2, and #3 (hereinafter also referred to as "command group #1–#3"). On the assumption that the command group #1–#3 is composed of "SET A COLOR (BLUE)", "DRAW A LINE (10,10)-(20,20)", and "DRAW A LINE (20,10)-(10,20)", respectively, to draw a blue cross and has a new pattern not being recorded in the command pattern manager 111. In such a case, the command pattern analyzing unit 110 assigns a pattern ID, e.g., ID #1 to the command group #1–#3, records the pattern ID with the command group #1–#3 in the command pattern manager #1 111, and transfers the pattern ID #1 and the actual command group #1–#3 to the client computer 105 via the communication object 109.

Upon receipt of them, the command pattern referring unit 115 recognizes that the pattern ID has not been recorded in the command pattern manager #2 117 and records them in it. Then the command processing thread 114 executes the command group command by command to draw the blue cross on the screen of the client computer 105.

There may be a cave where the blue cross is redrawn because of resizing of the window on which the blue cross is drawn. In such a ease, the higher-level library #1 103 generates the command group #1–#3 again. The command pattern analyzing unit 110 refers to the command pattern manager #1 111 for the command group #1–#3 and recognizes that the same command group has been recorded assigned with the pattern ID #1. Then the command pattern analyzing unit 110 transfers the pattern ID #1 alone or a direction to execute the command group assigned with the pattern ID #1 instead of the actual command group this time.

Upon receipt of them, the command pattern referring unit 115 refers to the command pattern manager #2 116 for the pattern ID #1 and recognizes that the pattern ID #1 is assigned to the command group #1–#3 in the command pattern manager #2 116. The pattern referring unit 115 reads the command group #1–#3 and supplies them to the command processing thread 114. Then the command processing thread 114 executes the command group to redraw the blue cross on the screen.

Accordingly, the communications traffic between both computers 101 and 105 can be reduced when the same command group is transferred after recording the pattern ID of the command group.

Next, a method for transferring a similar drawing command group to that previously transferred will be described. The similarity between command groups can be taken from the viewpoint of a difference in the argument between commands belonging to the same classification and a difference in the order of each command's classification (color, line, circle, rectangle, character string, etc.) described according to a predetermined rule.

A case where just parameter of each command is different from that of the recorded command will be explained by referring to FIG. 3 on the assumption that the command group #1–#3 has been already assigned with the pattern ID #1 and recorded in both command pattern manager #1 111 and #2 116 as the pattern ID #1.

The higher-level library #1 103 generates a series of commands #4, #5, and #6. The command pattern analyzing unit 110 compares command group #4–#6 with every recorded command groups and recognizes that it is similar to the command group #1–#3 except the difference both in the set colors between the command #1 and #4 and the coordinates of one end of the line segment between the command #2 and #5. For convenience, these differences are indicated by underlines in FIG. 3. The command pattern analyzing unit 110 calculates differences between arguments of these commands and transfers these differences, to the client computer 105, together with the pattern ID #1 or an direction to execute the command group assigned with the pattern ID #1 instead of the actual command group.

Upon receipt of them, the command pattern referring unit 115 refers to the command pattern manager #2 116 for the pattern ID #1 and recognizes that the pattern ID #1 is assigned to the command group #1–#3 in the command pattern manager #2 116. The pattern referring unit 115 reads the command group #1–#3 and regenerates the command group #4–#6 by applying the differences to the command group #1–#3. Then the command processing thread 114 executes the command group #4–#6 to redraw a red cross on the screen.

As described above, both computers have the command pattern managers #1 111 and #2 116 for managing the same pattern IDs and equally update the management information on pattern IDs contents. Thus even when a command group having a similar pattern to a recorded command group is generated, the communication traffic required for command transfer between both computers can be reduced.

When the difference between newly generated command group and a recorded command group is on a command level, the command relay library 104 transfers a command corresponding to the difference together with the pattern ID corresponding to the recorded command group in the same way, thereby the present invention can be executed.

There may be a case a series of command group, severally assigned with a pattern ID, is transferred, such as a series of command having complicated nests of command groups. Even in such a case, assigning a new pattern ID to a series of command group, severally assigned with a pattern ID, can reduce the communications traffic between both computers.

The command transfer method explained in the above embodiment can be distributed as a program, to be executed by a computer, recorded in a medium or transmitted via a LAN or Internet. As a storage medium for storing the programs of the command relay library 104 and the command execution module 106, any storage mediums capable of storing programs and being read by a computer, such as, magnetic disk, floppy disk, hard disk, optical disk (CD-ROM, CD-R, DVD, etc.), photo-electromagnetic disk, semiconductor memory, and others can be used. It does not matter if the storage system is different.

Furthermore, the storage medium is not limited to a medium independent of a computer and includes a storage medium for downloading and storing or temporarily storing a program transmitted from a LAN or Internet. Additionally, the storage medium is not limited to one medium and it may be composed of a plurality of media such that the command relay library 104 and the command execution module 106 are stored in separate storage media.

What is claimed is:

1. A distributed-processing system in which a web server entrusts part of a process to a user's computer for accessing a homepage stored in the web server, comprising:

in the web server:
means for generating a series of commands to perform the part of the process;
means for assigning a pattern identifier (ID) to the series of commands;
means for transferring the series of commands with the assigned pattern ID to the user's computer; and
first means for managing the relation between the series of commands and the assigned pattern ID;
wherein the assigning means does not assign a new pattern ID to a series of commands when the same series of commands has been managed by the first managing means, and the transferring means transfers only the pattern ID to the user's computer instead of the series of commands; and in the user's computer:
means for receiving one of the series of commands with the corresponding pattern ID or only the pattern ID;
means for executing the received series of commands;
second means for managing the relation between the series of commands and the corresponding pattern ID received from the transferring means; and
means for reading the series of commands assigned with the received pattern ID by referring to the second means for managing when only the pattern ID is received;
wherein the executing means executes the read series of commands when only the pattern ID is received.

2. The distributed-processing system of claim 1, wherein: the series of commands is a series of drawing commands.

3. The distributed-processing system of claim 1, further comprising:
an application program for directing the generating means to generate the series of commands.

4. The distributed-processing system of claim 1, wherein the first and second managing means each includes:
a table for recording the relation between the series of commands and the corresponding pattern ID.

5. The distributed-processing system of claim 1, wherein the user's computer further comprises:
a storage unit for storing the pattern ID managed by the second managing means and the corresponding series of commands, the unit which the second managing means stores them when the second managing means is ended and reads them when the second managing means is restarted.

6. The distributed-processing system of claim 5, wherein the storage unit is a hard disk drive.

7. A distributed-processing system in which a first computer entrusts part of a process to a second computer, comprising:
in the first computer:
means for generating a series of commands to perform the part of the process;
means for assigning a pattern identifier (ID) to the series of commands;
means for transferring the series of commands with the assigned patter ID to the second computer; and
first means for managing the relation between the series of commands and the assigned pattern ID;
wherein the assigning means does not assign a new pattern ID to a series of commands when the same series of commands has been managed by the first managing means, and the transferring means transfers only the pattern ID to the second computer instead of the series of commands; and
in the second computer:
means for receiving the series one of the series of commands with the corresponding pattern ID or only the pattern ID;
means for executing the received series of commands;
second means for managing the relation between the series of commands and the corresponding pattern ID received from the transferring means; and
means for reading the series of commands assigned with the received pattern ID by referring to the second means for managing when only the pattern ID is received;
wherein the executing means executes the read series of commands when only the pattern ID is received; and
wherein
the assigning means, when a series of commands generated by the generating means is similar to a series of commands managed by the first managing means, detects a difference between them;
the transferring means transfers, to the second computer, the detected difference and the pattern ID corresponding to the managed series of commands instead of the generated series of commands;
the receiving means receives the difference and the pattern ID from the transferring means;
the reading means regenerates the generated series of commands from the received difference and the series of commands assigned with the received pattern ID by referring to the second managing means when the difference and the pattern ID are received; and
the executing means executes the regenerated series of commands.

8. The distributed-processing system of claim 7, wherein:
the difference is a parametric difference between the generated series of commands and the managed series of commands.

9. The distributed-processing system of claim 1, wherein the web server further comprises:
a storage unit for storing the pattern ID managed by the web server's managing means and the corresponding series of commands, the unit which the first managing means stores them when the first managing means is ended and reads them when the first managing means is restarted.

10. The distributed-processing system of claim 9, wherein the storage unit is a hard disk drive.

11. A computer which entrusts part of a process to another computer, comprising:

means for generating a series of commands to perform the partial process;
means for assigning a pattern ID to the series of commands;
means for transferring the series of commands with the corresponding pattern ID to the other computer; and
means for managing the relation between the series of commands and the corresponding pattern ID; wherein:
the assigning means does not assign a new pattern ID to a series of commands when the same series of commands has been managed the managing means, and the transferring means transfers the pattern ID alone to the other computer instead of the series of commands;
wherein:
the assigning means, when a series of commands generated by the generating means is similar to a series of commands managed by the managing means, detects a difference between them; and
the transferring means transfers, to the other computer, the detected difference and the pattern ID corresponding to the managed series of commands instead of the generated series of commands.

12. A command transfer method in a distributed-processing system in which a first computer entrusts part of a process to a second computer, comprising:
generating a series of commands to perform the partial process;
assigning a pattern identifier (ID) to the series of commands;
recording the relation between the series of commands and the corresponding pattern ID in a table of the first computer;
transferring, to the second computer, the series of commands with the corresponding pattern ID when the series of commands to be transferred has not been recorded in the first computer's table, and only the pattern ID instead of the series of commands when the series of commands to be transferred has been recorded in the first computer's table;
receiving the series of commands with the corresponding pattern ID or only the pattern ID from the first computer;
recording the relation between the series of commands and the corresponding pattern ID, received from the first computer, in a table of the second computer;
reading the series of commands assigned with the received pattern ID by referring to the second computer's table when only the pattern ID is received; and
executing the received series of commands when the series of commands with the corresponding pattern ID are received, and the read series of commands when only the pattern ID is received.

13. The method of claim 12, further comprising:
storing the pattern ID recorded in the first computer's table and the corresponding series of commands in a first computer's storage unit when the first computer's table is ended; and
reading the pattern ID and the corresponding series of commands from the first computer's storage unit is restarted.

14. The method of claim 12, further comprising:
storing the pattern ID recorded in the second computer's table and the corresponding series of commands in a second computer's storage unit when the second computer's table is ended; and reading the pattern ID and the corresponding series of commands from the second computer's storage unit is restarted.

15. A command transfer method in a distributed-processing system in which a first computer entrusts part of a process to a second computer, comprising:

generating a series of commands to perform the partial process;

assigning a pattern identifier (ID) to the series of commands;

recording the relation between the series of commands and the corresponding pattern ID in a table of the first computer;

transferring, to the second computer, the series of commands with the corresponding pattern ID when the series of commands to be transferred has not been recorded in the first computer's table, and only the pattern ID instead of the series of commands when the series of commands to be transferred has been recorded in the first computer's table;

receiving the series of commands with the corresponding pattern ID or only the pattern ID from the first computer;

recording the relation between the series of commands and the corresponding pattern ID, received from the first computer, in a table of the second computer;

reading the series of commands assigned with the received pattern ID by referring to the second computer's table when only the pattern ID is received;

executing the received series of commands when the series of commands with the corresponding pattern ID are received, and the read series of commands when only the pattern ID is received;

detecting, when a series of commands generated by the generating means is similar to a series of commands recorded in the first computer's table, a difference between them;

transferring, to the second computer, the detected difference and the pattern ID corresponding to the recorded series of commands instead of the generated series of commands;

receiving the difference and the pattern ID from the first computer;

regenerating the generated series of commands from the received difference and the series of commands assigned with the received pattern ID by referring to the second computer's table when the difference and the pattern ID are received; and executing the regenerated series of commands.

16. The method of claim 15, wherein:

the difference is a parametric difference between the generated series of commands and the managed series of commands.

* * * * *